(12) United States Patent
Gavin et al.

(10) Patent No.: US 7,820,216 B1
(45) Date of Patent: Oct. 26, 2010

(54) APPARATUS AND METHODS FOR PASTEURIZING FOOD PRODUCT

(75) Inventors: Jesse Gavin, Poynette, WI (US); Bryan Davis, Madison, WI (US); Dennis Conohan, Cross Plains, WI (US); Seth T. Pulsfus, Poynette, WI (US); Steve Loomis, Madison, WI (US); Bryan J. Lemmenes, Stoughton, WI (US)

(73) Assignee: Alkar-RapidPak-MP Equipment, Inc., Lodi, WI (US)

( * ) Notice: Subject to any disclaimer, the term of this patent is extended or adjusted under 35 U.S.C. 154(b) by 263 days.

(21) Appl. No.: 11/877,381

(22) Filed: Oct. 23, 2007

(51) Int. Cl.
*A01K 43/00* (2006.01)
(52) U.S. Cl. .................. 426/233; 426/521; 426/231; 426/511; 426/520
(58) Field of Classification Search .............. 426/520, 426/521, 407, 665, 399, 233, 231, 511; 99/451, 99/360, 361, 367, 293
See application file for complete search history.

(56) References Cited

U.S. PATENT DOCUMENTS

| | | | |
|---|---|---|---|
| 3,971,306 A * | 7/1976 | Wiese et al. | 99/348 |
| 4,471,750 A * | 9/1984 | Burtea | 126/21 A |
| 5,207,151 A * | 5/1993 | Le Viet et al. | 99/451 |
| 6,291,003 B1 * | 9/2001 | Riemann et al. | 426/511 |
| 6,622,513 B1 * | 9/2003 | Howard | 62/380 |
| 6,675,589 B1 | 1/2004 | Howard | |

OTHER PUBLICATIONS

Unitherm Food Systems: http://www.unithermfoodsystems.com/main.html, last visited Jan. 9, 2008 and http://www.unithermfoodsystems.com/Pasteurizers/products_pasteurizers.html, last visited Jan. 9, 2008.

* cited by examiner

*Primary Examiner*—Drew E Becker
*Assistant Examiner*—Preston Smith
(74) *Attorney, Agent, or Firm*—Andrus, Sceales, Starke & Sawall, LLP

(57) ABSTRACT

Apparatus and methods for pasteurizing food product are provided. The apparatus includes a cabinet enclosing the food product as it is transported from upstream to downstream through a series of processing zones including a pre-condensing zone, a pre-heating zone, a pasteurizing zone, a post-heating zone, and a post-condensing zone. In use, the food product is conveyed through the series of processing zones, which together function to efficiently and effectively heat and apply pasteurizing steam to the surfaces of the product to kill bacteria, while at the same time managing migration of steam from the pasteurizing zone and preventing steam from migrating out of the cabinet into the surrounding area.

19 Claims, 5 Drawing Sheets

APPARATUS AND METHODS FOR PASTEURIZING FOOD PRODUCT

BACKGROUND

The present application is directed to improved apparatus and methods for controlling contamination of food products in a food processing environment. The apparatus and methods described herein maintain food quality and reduce the risk to the public from food-borne pathogens.

Although generally preventable, food-borne illness remains a serious problem in the United States. Contaminated food has been estimated to cause 76 million illnesses in the United States each year, including 325,000 cases resulting in hospitalization. The Council for Agricultural Science and Technology has estimated that food-borne diseases caused by the most common bacterial pathogens found in ready-to-eat (RTE) foods—*Listeria monocytogens, Campylobacter jejuni, Escherichia coli, Salmonella* and *Staphylococcus aureus*—may cause as many as 9,000 deaths each year. The present application discloses methods and systems that will benefit public health by eliminating or reducing food-borne pathogens from RTE foods.

Researchers and processors have been working for years on developing and implementing post-cook (post-process) lethality treatments for at-risk RTE meats. The industry has options for both pre- and post-packaging lethal treatments, including steam, hot water, radiant heat, and high-pressure processing. Application of steam surface pasteurization allows post-process lethality treatments to be achieved at a production line speed that is comparable to that of commercial packaging for RTE foods.

There is a continuing need for more efficient, more effective, and simplified methods and systems for treating the surface of a food product to kill and/or significantly reduce the growth of food-borne pathogens.

SUMMARY

The present application describes apparatus and methods for pasteurizing food product and for providing more efficient, effective, and simplified means for treating the surface of the food product to kill and/or significantly reduce the growth of food-borne pathogens. In the illustrated embodiment, a cabinet encloses the food product as it is transported on a conveyor from upstream to downstream through a series of processing zones. The processing zones include a pre-condensing zone for condensing steam from air surrounding the food product, a pre-heating zone evaporating excess water from surfaces of the product and potentially superheating steam surrounding the food product, a pasteurizing zone applying pasteurizing steam to the surfaces of the product, a post-heating zone evaporating excess water from the surfaces of product and potentially superheating steam surrounding the food product, and a post-condensing zone condensing steam from air surrounding the food product. In use, the food product is conveyed through the series of processing zones, which together function to efficiently and effectively pasteurize the surfaces of the product to kill bacteria, while at the same time manage migration of steam from the cabinet into the surrounding area.

BRIEF DESCRIPTION OF THE DRAWINGS

The best mode of practicing the invention is described hereinbelow with reference to the following drawing figures.

DETAILED DESCRIPTION OF THE INVENTION

Figure 1:
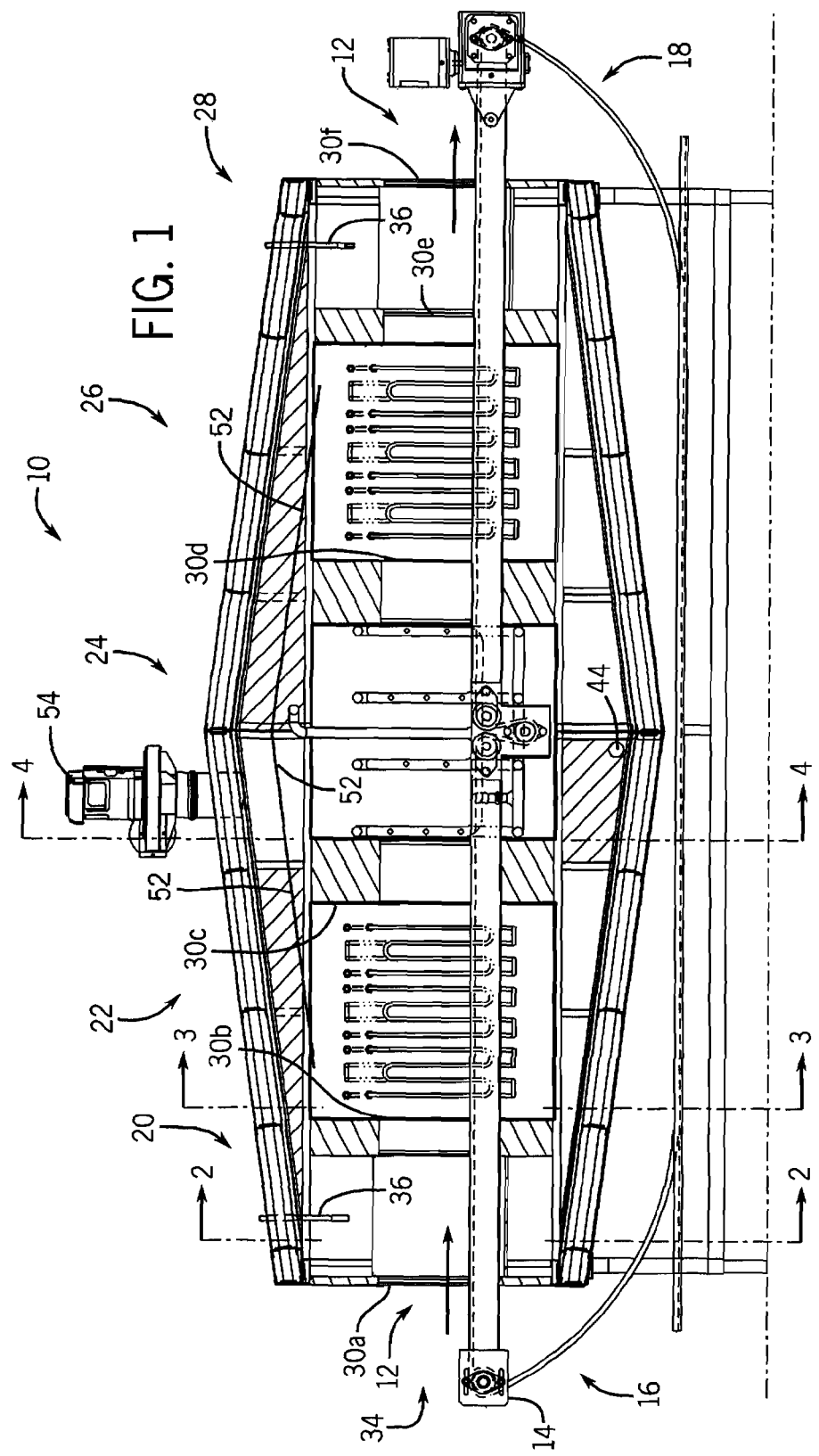
FIG. 1 is a sectional elevation view of apparatus for pasteurizing food product.

FIG. 1 is a side elevation view showing a cabinet 10 that includes a tunnel 12 for passage of food products such as pre-cooked, unwrapped bologna, meat, hams, an/or other whole muscle products. An endless conveyor 14 transports the food product through the tunnel 12 from upstream 16 to downstream 18. The cabinet 10 includes a series of processing zones 20-28 for treating surfaces of the food product and, more specifically, killing and/or significantly reducing growth of food-borne pathogens, and for controlling migration of steam from the cabinet 10. The processing zones 20-28 include a pre-condensing zone 20, a pre-heating zone 22, a pasteurizing zone 24, a post-heating zone 26 and a post-condensing zone 28. The tunnel 12 extends through each of the zones 20-28 and forms a pathway for the food product to travel through the zones 20-28 in series. Each zone 20-28 is separated from adjacent zones by a baffle 30a-30f, which preferably consists of a silicone drape having a plurality of vertical slits 32 which define respective door flaps 33. The conveyor 14 carries the food product from upstream 16 to downstream 18 and through each zone 20-28. As it travels from one zone to the next, the food product passes through a respective silicone baffle 30a-30f. Specifically, the door flaps 33 of each baffle 30a-30f separate to allow passage of the food product. Advantageously, the baffles 30a-30f physically separate the zones 20-28 and allow for separate temperature control for each zone 20-28. However, even though the baffles 30a-30f provide the noted separation, a certain amount of air and steam passes through the baffles 30a-30f and travels amongst the respective zones 20-28. The unique combination of processing structures detailed herein below provides an efficient and effective means for pasteurizing the food product while controlling migration of steam and preventing infiltration of steam to the areas surrounding the pasteurization cabinet 10.

Figure 2:
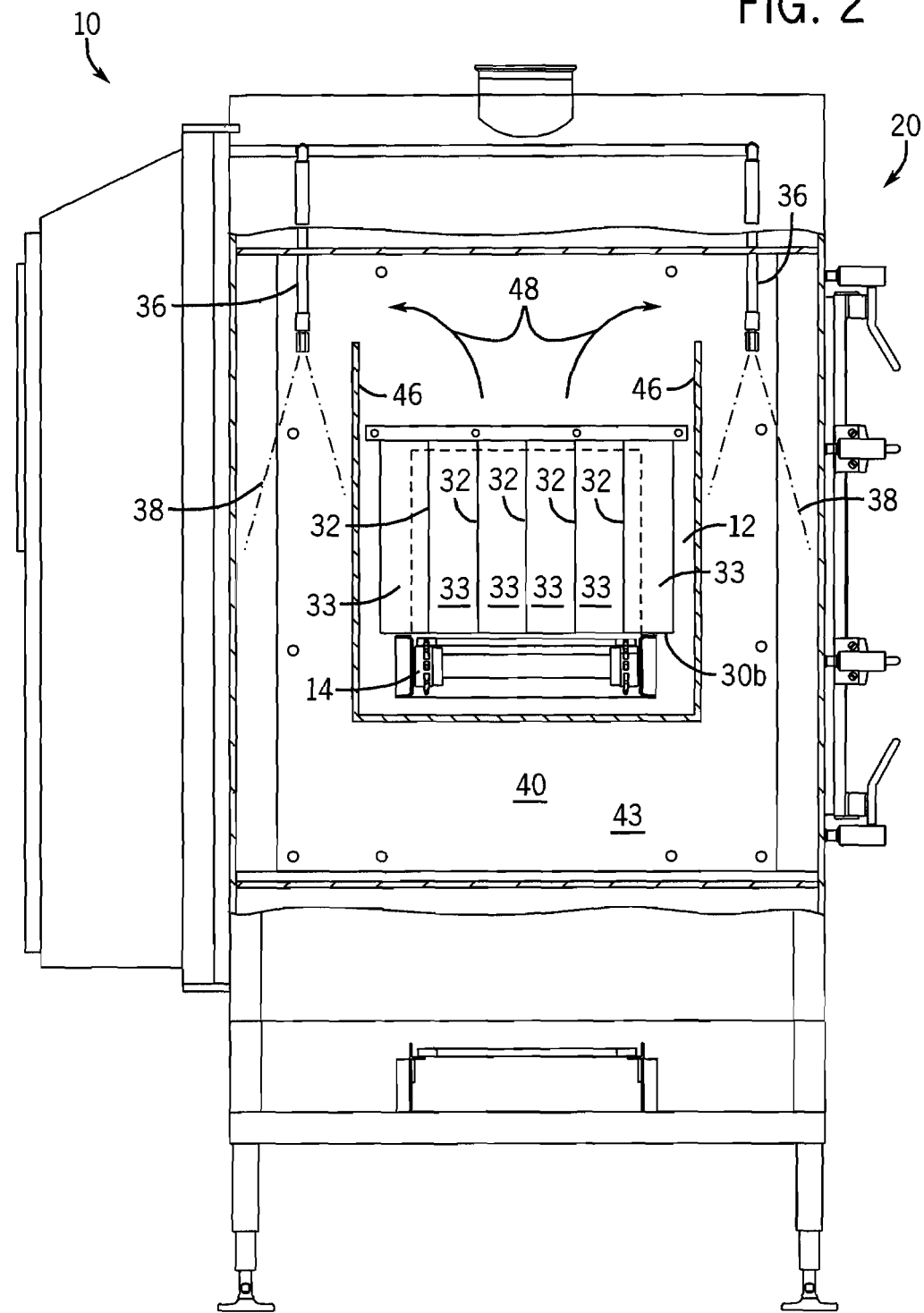
FIG. 2 is a view of Section 2-2 taken in FIG. 1.

FIGS. 1 and 2 show structures of the pre-condensing zone 20. Food product enters the pre-condensing zone 20 at the load end 34 of the cabinet 10 via baffle 30a. Water condensing nozzles 36 receive a supply of water and distribute supplies of atomizing mist 38 into the pre-condensing zone 20 to facilitate condensation of any steam that migrates into the pre-condensing zone 20 from the adjacent, subsequent pre-heating zone 22. A set of baffles 46 advantageously block the supply of mist 38 from contacting the food product as it travels through the zone 20 on conveyor 14. As shown, the baffles 46 extend perpendicular to the conveyor 14 and preferably extend upwardly past the lower end of the nozzles 36. Advantageously, the orientation of the nozzles 36 and baffles 46 cause steam to draw away from the tunnel 12 and the food product on the conveyor 14, as shown by arrows 48. The steam is condensed into the lower portion 40 of the pre-condensing zone 20 and drains under removable wall 43 and migrates via gravity down to cabinet drain 44. The pre-condensing zone 20 thus advantageously condenses any migrant steam from the subsequent processing zones and prevents such steam from exiting the cabinet 10 via the baffle 30a and entering the surrounding area. The unique combination also advantageously eliminates the need for a dedicated drying fan at the upstream loading end of the cabinet 10.

Figure 3:
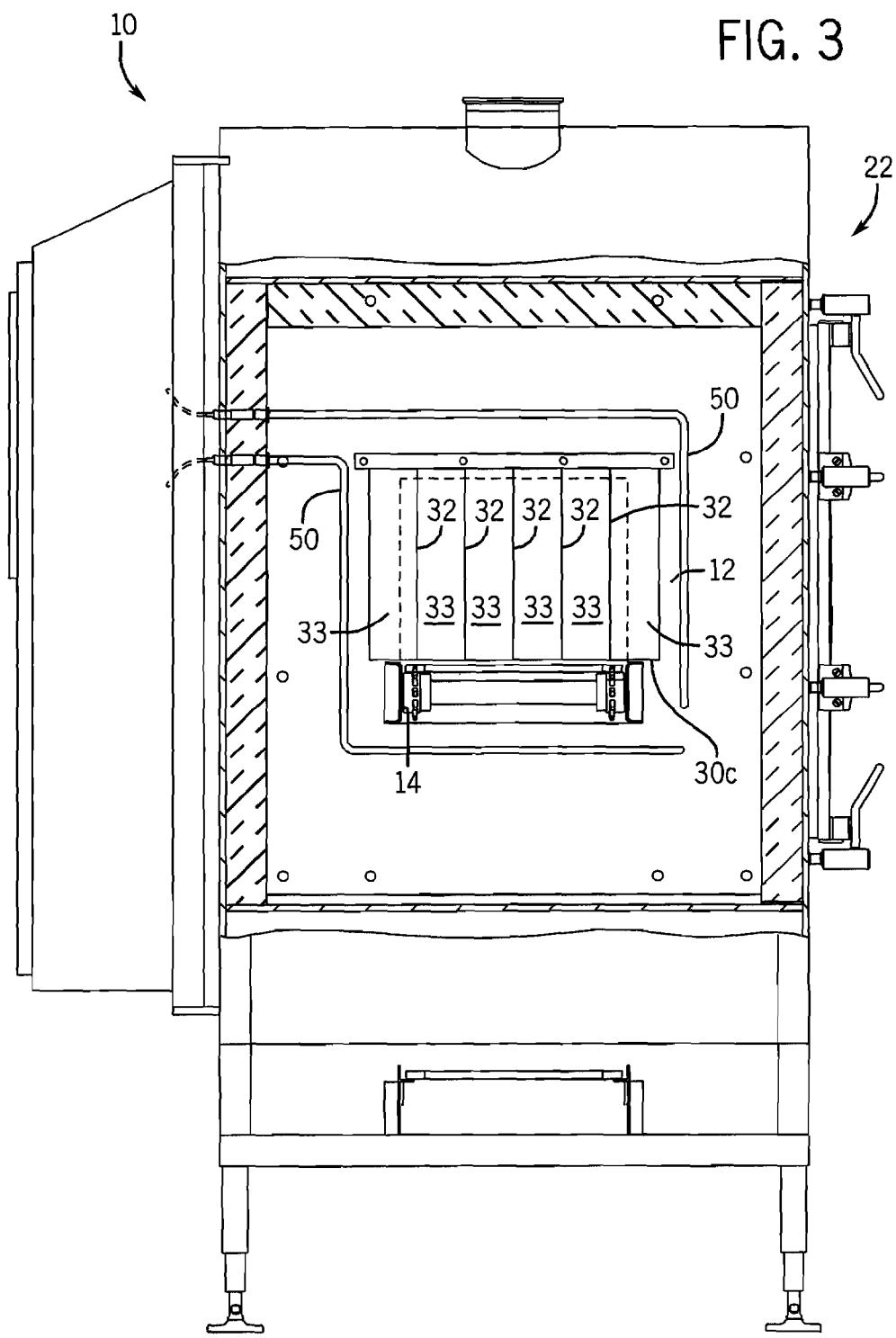
FIG. 3 is a view of Section 3-3 taken in FIG. 1.

FIGS. 1 and 3 show structures of the pre-heating zone 22. The food product enters the pre-heating zone 22 by traveling along the conveyor 14 and passing through internal baffle 30b. The pre-heating zone 22 is equipped to heat the product a sufficient amount to remove moisture from the surfaces of the food product, to sufficiently thaw the outer layer of the food product (if the product is provided initially in a frozen state), and to kill some amount of bacterial present on the surfaces of the food product. In the preferred embodiment, electrical heating elements 50 provide a heat source for controlling the temperature of the pre-heating zone 22 to a predetermined condition set point. In a further preferred arrangement, the electrical heating elements 50 are designed to superheat the heating zone 22 to a temperature that is greater than 212° Fahrenheit. The superheated zone 22 provides a desired kill rate of bacteria on the surfaces of the food product and, when combined with the subsequent pasteurization step described below, the superheated zone is useful to heat the surfaces of the product and allow thus maximum pasteurization using the application of steam.

Another beneficial effect of the pre-heating process and preferably the super-heating process is that any steam that migrates into the pre-heating zone 22 from the subsequent pasteurizing zone 24 is superheated. The superheating of steam in the pre-heating zone 22 advantageously limits the migration of steam out of the cabinet 10 and into the surrounding control room. That is, heating the air in the pre-heating zone 22 dries the air and thus allows the air to hold an increased amount of moisture relative to the adjacent zones 20, 26, thus discouraging migration of moisture out of the pre-heating zone 22.

Figure 4:
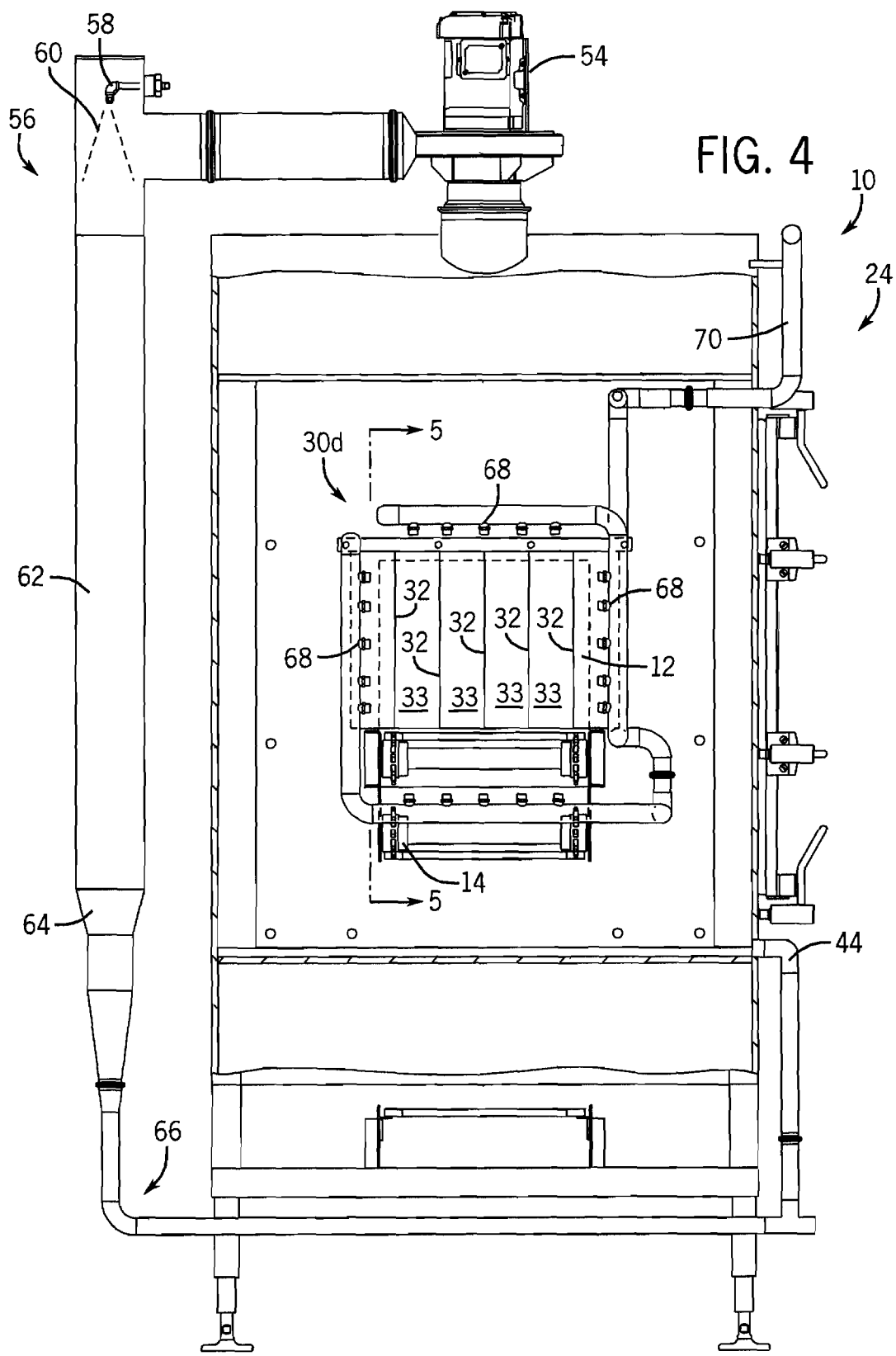
FIG. 4 is a view of Section 4-4 taken in FIG. 1.

The superheated steam in the pre-heating zone 22 is advantageously evacuated via a false roof 52 in the tunnel 12. Specifically, an exhaust fan 54 draws the superheated steam out of the pre-heating zone 22 via the false roof 52 in the tunnel 12. As shown in FIGS. 1 and 4, the exhaust fan 54 draws the steam from the tunnel 12 and discharges it to a condenser 56. Condenser 56 includes a spray nozzle 58 for spraying an atomizing mist into tee 60. The atomizing mist facilitates condensation of the exhausted steam into condenser section 62. The condenser pipe is subsequently reduced in reducer 64 and further discharged to cabinet drain 44 via piping 66.

FIGS. 1 and 4 show structures of the pasteurizing zone 24. The food product exits the pre-heating zone 22 and enters the pasteurizing zone 24 by passing through internal baffle 30c. The pasteurizing zone 24 includes a plurality of steam nozzles 68 arranged to spray pasteurizing steam, preferably at a low pressure and high velocity, directly onto the surfaces of the food product as it travels along the conveyor 14. As described above, the surfaces of the food product have previously been heated in the pre-heating zone 22. Application of the pasteurizing steam therefore further raises the temperature of the surfaces of the food product to obtain maximum desired log kill of bacteria remaining on the food product. Steam nozzles 68 receive the pasteurizing steam from an external source via a steam supply piping assembly 70.

Figure 5:
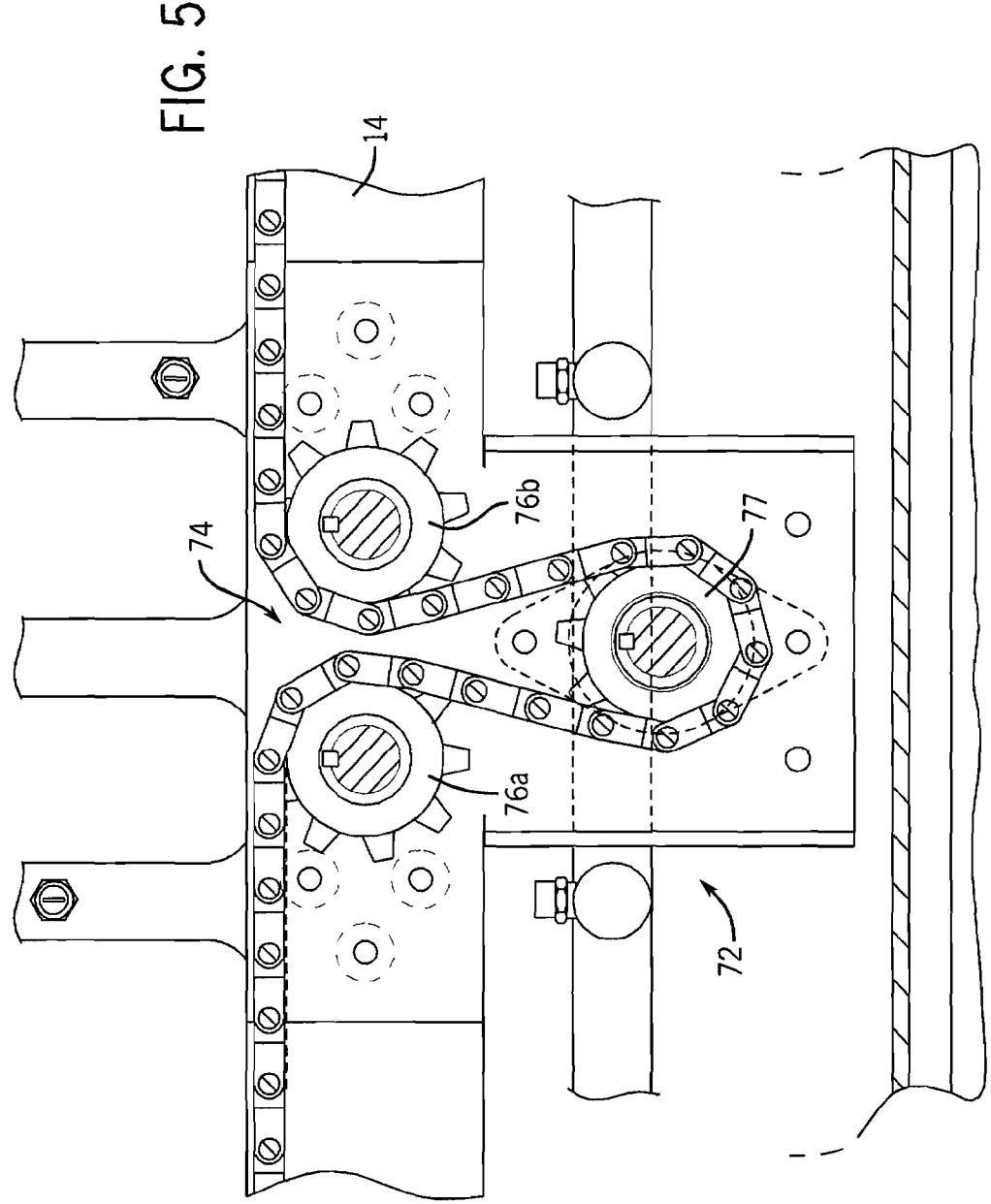
FIG. 5 is a view of Section 5-5 taken in FIG. 1.

Advantageously, the pasteurizing zone 24 is equipped to cover the entire surface area of the food product with pasteurizing steam. As shown in FIGS. 1 and 5, conveyor 14 includes a downward loop 72 that defines a gap 74 in the conveyor. Gap 74 facilitates application of pasteurizing steam to the lower surfaces of the food product. Downward loop 72 is rotatably supported by adjacent conveyor sprockets 76a and 76b and a third, lower conveyor sprocket 77 that is preferably positioned between the conveyor sprockets 76a and 76b.

Preferably, the pasteurizing zone 24 does not include a vent for evacuating pasteurizing steam; and thus the pasteurizing steam is encouraged to stay in the pasteurizing zone 24 and contact all surfaces of the food product. However, during operation, some of the pasteurizing steam tends to migrate from the pasteurizing zone via the internal baffles 30c and 30d. Steam that passes through internal baffles 30c and 30d is either exhausted through the false roofs 52 present in the pre-heating zones 22, 26 by the exhaust fan 54. Also, steam that migrates out of the pre- and post-heating zones 22, 26 and into the pre- and post-condensing zones 20, 28 is condensed and drained to the common cabinet drain. Thus the combination of the pre- and post-heating zones and the pre- and post-condensing zones 20, 28 advantageously prevents migration of steam into the surrounding environment.

FIG. 1 shows the structure of post-heating zone 26, which is substantially a mirror image of the pre-heating zone 22. Reference is therefore also made to FIG. 3 for discussion and exemplification purposes. The food product exits the pasteurizing zone 24 and enters the post-heating zone 26 by passing through internal baffle 30d. Once inside the post-heating zone 26, heating elements that mirror the heating elements 50 heat the food product to remove any condensate on the surfaces thereof. Similar to the pre-heating zone 22, the post-heating zone 26 is equipped to heat the product a sufficient amount to remove moisture from the surfaces of the food product and further kill at least some amount of bacteria present on the surfaces of the food product. In the preferred embodiment, electrical heating elements (e.g. 50 shown in pre-heating zone 22) provide a heat source for the post-heating zone 26. In a preferred arrangement, the heating elements are designed to superheat the post-heating zone 26 to a temperature that is greater than 212° Fahrenheit. The superheated post-heating zone 26 provides desired maximization of kill rate of bacteria on the surfaces of the food product and limits migration of steam into the adjacent post-condensing zone 28.

As in the pre-heating zone 22, one possible effect of the superheating process in the post-heating zone 26 is that steam that migrates into the post-heating zone 26 from the pasteurizing zone 24 is superheated. Such superheated steam is advantageously evacuated from the post-heating zone 26 via a false roof 52 in the tunnel 12. Exhaust fan 54 draws the superheated steam out of the post-heating zone 26 via the false roof 52 in the tunnel 12. As shown in FIGS. 1 and 4 and discussed above, the exhaust fan 54 draws the steam from the tunnel 12 and discharges it to a condenser 56.

FIG. 1 shows the structure of the post-condensing zone 28, which is substantially a mirror image of the pre-condensing zone 20. Food product exits the post-heating zone 26 and enters the post-condensing zone 28 by passing through internal baffle 30e. Similar to the pre-condensing zone 20, the post-condensing zone 28 has water condensing nozzles 36 that receive a supply of water and distribute supplies of atomizing mist into the post-condensing zone 28 to facilitate condensation of any steam that migrates into the post-condensing zone 28 from the adjacent post-heating zone 26. A set of baffles similar to baffles 46 in the pre-condensing zone 20 block the supply of mist and prevent the supply of mist from contacting the food product as it travels through the zone 28 on conveyor 14. The baffles extend perpendicular to the conveyor 14 and preferably extend upwardly past the lower end of the nozzles. Advantageously, the orientation of the nozzles and baffles cause steam to draw away from the tunnel 12 and the food product on the conveyor 14 (as for example shown by arrows 48 in FIG. 2). The steam is condensed into the lower portion of the post-condensing zone 28 and drains via gravity down to cabinet drain 44.

The food product exits the post-condensing zone 28 by passing through a final baffle 30f and travels further on conveyor 14 for additional processing and/or packaging.

The operation of the conveyor and/or processing zones 20-28 is preferably controlled by a controller (not shown). In the preferred embodiment the controller comprises a computer processor that communicates with a plurality of sensors provided in the system. The sensors can include movement sensors, temperature sensors, humidity sensors, or any other type of sensor that facilitates efficient monitoring and control of the pasteurization process. The controller and sensors thus provide independent control of the temperature and processes in each respective zone 20-28. Also, the conveyor and respective zones can operate continuously or intermittently to promote efficiency. For example, in the preferred embodiment, at least one photo-eye sensor is positioned outside the pre-condensing zone 20 and senses and informs the controller of the existence of a food product on the conveyor. The controller can then provide operation of specific processes in the zones dependent upon the existence of food product on the conveyor. For example, the controller can turn the supply to nozzles 36 on and off depending upon whether food product is on the conveyor and thus decreasing waste and increasing efficiency of operation. That is, the controller can turn the supply of steam to the pasteurizing zone on and off depending upon the existence of food product on the conveyor. The controller can also or alternatively turn the heating elements in a heating zone on or off depending upon whether the temperature in the respective zone is below or above a predetermined set point.

It should be understood that the drawings and specification are to be considered an exemplification of the principles of the invention, which is more particularly defined in the appended claims. The term pasteurization is used herein in accordance with its normal dictionary definition, including partial sterilization of a substance at a temperature and for a period of exposure that destroys objectionable organisms without major chemical alteration of the substance, and including destruction of pathogenic and/or spoilage organisms for extending shelf life. The pasteurizing medium is preferably steam, or alternatively hot air or superheated steam, though other types of pasteurizing media may be used.

What is claimed is:

1. A method for pasteurizing food product, the method comprising the steps of
   conveying the food product through a series of processing zones including a pre-heating zone, a pasteurizing zone, and a post-heating zone;
   heating the product in the pre-heating zone to evaporate excess water from surfaces of the product;
   applying pasteurizing steam to the surfaces of the product in the pasteurizing zone to kill bacteria on the surfaces of the product; and
   heating the product in the post-heating zone to evaporate excess water from the surfaces of the product.

2. The method of claim 1, wherein the zone atmosphere is superheated to a temperature above 212 degrees Fahrenheit in the pre-heating zone and the post-heating zone.

3. The method of claim 1, comprising the steps of:
   conveying the food product through an additional set of zones, including a pre-condensing zone located upstream of the pre-heating zone, the pre-condensing zone condensing steam from air surrounding the food product; and a post-condensing zone located downstream of the post-heating zone, the post-condensing zone condensing steam from air surrounding the food product.

4. The method of claim 1, comprising the step of monitoring at least one parameter in one of the respective zones and independently changing an operational characteristic of the respective processing zones based upon the monitored parameter.

5. The method of claim 1, comprising the step of conveying the food product through a cabinet enclosing the food product as it is transported from upstream to downstream through the series of processing zones.

6. The method of claim 5, comprising the step of conveying the food product through a tunnel through the respective processing zones and wherein the pre-heating zone is adjacent the pasteurizing zone and the pasteurizing zone is adjacent the post-heating zone.

7. The method of claim 6, comprising the step of passing the food product through a series of baffles, wherein the adjacent zones are separated by a baffle in the series through which the food product is transported.

8. The method of claims 5, comprising the step of operating at least one electrical heating element in the pre-heating zone to direct heat onto the surfaces of the product and thereby encourage the evaporation of excess water from the surfaces of the product.

9. The method of claim 5, comprising the step of operating at least one electrical heating element in the post-heating zone to direct heat onto the surfaces of the product and thereby encourage the evaporation of excess water from the surfaces of the product.

10. The method of claim 5, comprising the step of operating at least one nozzle spraying the pasteurizing steam onto the surfaces of the food product in the pasteurizing zone.

11. The method of claim 10, comprising the step of venting pasteurizing steam that migrates from the pasteurizing zone into the pre-heating zone through a false ceiling in the pre-heating zone.

12. The method of claim 11, comprising the step of operating an exhaust fan to exhaust the pasteurizing steam vented from the pre-heating zone via the false ceiling.

13. The method of claim 12, comprising the step of condensing steam exhausted by the exhaust fan with a condenser.

14. The method of claim 10, comprising the step of venting pasteurizing steam that migrates from the pasteurizing zone into the post-heating zone through a false ceiling in the post-heating zone.

15. The method of claim 14, comprising the step of operating an exhaust fan to exhaust the pasteurizing steam vented from the post-heating zone via the false ceiling.

16. The method of claim 15, comprising the step of condensing steam exhausted by the exhaust fan with a condenser.

17. The method of claim 5, comprising the step of transporting the food product through the tunnel on a conveyor.

18. The method of claim 17, comprising the step of contacting surfaces of the food product that are closest to the conveyor by transporting the food product along a conveyor having a substantially flat section defined by a conveyor belt that extends through the pasteurizing zone, wherein the belt follows a downward loop that defines a gap in the conveyor that allows steam to contact surfaces of the food product that are closest to the conveyor.

19. The method of claim 5, comprising the step of operating a controller providing independent control of the temperatures in each respective processing zone.

* * * * *